United States Patent
Ooba et al.

(10) Patent No.: US 8,435,125 B2
(45) Date of Patent: May 7, 2013

(54) POWER TRANSMISSION SHAFT, DRIVE SHAFT, AND PROPELLER SHAFT

(75) Inventors: Hirokazu Ooba, Iwata (JP); Kazuhiko Yoshida, Iwata (JP); Keisuke Sone, Iwata (JP)

(73) Assignee: NTN Corporation, Osaka (JP)

( * ) Notice: Subject to any disclaimer, the term of this patent is extended or adjusted under 35 U.S.C. 154(b) by 103 days.

(21) Appl. No.: 13/058,941

(22) PCT Filed: Aug. 21, 2009

(86) PCT No.: PCT/JP2009/064604
§ 371 (c)(1), (2), (4) Date: Feb. 14, 2011

(87) PCT Pub. No.: WO2010/029841
PCT Pub. Date: Mar. 18, 2010

(65) Prior Publication Data
US 2011/0136580 A1   Jun. 9, 2011

(30) Foreign Application Priority Data
Sep. 12, 2008  (JP) ................................ 2008-235104

(51) Int. Cl.
*F16C 3/02* (2006.01)
(52) U.S. Cl.
USPC ............................ 464/179; 464/902; 464/906
(58) Field of Classification Search .................. 464/179, 464/182, 902, 904–906; 420/121, 126; 403/359.1–359.6; 148/902
See application file for complete search history.

(56) References Cited

U.S. PATENT DOCUMENTS

| 6,319,337 B1 | 11/2001 | Yoshida et al. |
| 6,673,167 B2 * | 1/2004 | Yoshida et al. ............ 148/902 X |
| 7,112,141 B2 * | 9/2006 | Sakurai et al. ......... 403/359.1 X |

(Continued)

FOREIGN PATENT DOCUMENTS

| EP | 1 647 608 | 4/2006 |
| JP | 05-043941 | 2/1993 |

(Continued)

OTHER PUBLICATIONS

International Preliminary Report on Patentability and Written Opinion of the International Searching Authority issued Apr. 28, 2011 in International (PCT) Application No. PCT/JP2009/064604.

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A power transmission shaft includes a torque-transmission teeth portion formed on an outer peripheral surface on an end portion side, and a smooth portion formed on the outer peripheral surface adjacent to the torque-transmission teeth portion so as to have a stepwise reduced diameter. A ratio of a minimum diameter of the smooth portion to a minimum diameter of the torque-transmission teeth portion is set to 0.9 or more and 1.02 or less. Further, the torque-transmission teeth portion and the smooth portion undergo heat treatment so as to form a heat-treated hardened layer. The heat-treated hardened layer is formed to increase in depth from a side of the torque transmission teeth portion to a side of the smooth portion. At least a minimum diameter portion of the smooth portion undergoes full hardening.

18 Claims, 5 Drawing Sheets

U.S. PATENT DOCUMENTS

| | | |
|---|---|---|
| 2002/0017343 A1 | 2/2002 | Yoshida et al. |
| 2006/0076088 A1 | 4/2006 | Nagato et al. |
| 2009/0110589 A1 | 4/2009 | Usui et al. |

FOREIGN PATENT DOCUMENTS

| | | | |
|---|---|---|---|
| JP | 3194093 | | 2/1993 |
| JP | 05043941 | * | 2/1993 |
| JP | 3539981 | | 12/1993 |
| JP | 6-35021 | | 5/1994 |
| JP | 10-036937 | | 2/1998 |
| JP | 10036937 | * | 2/1998 |
| JP | 2000-240669 | | 9/2000 |
| JP | 2003-307211 | | 10/2003 |
| JP | 2003307211 | * | 10/2003 |
| JP | 2006-064061 | | 3/2006 |
| JP | 2006064061 | * | 3/2006 |
| JP | 2006-138007 | | 6/2006 |
| JP | 2007-107027 | | 4/2007 |
| JP | 2007-107029 | | 4/2007 |
| JP | 2008-196013 | | 8/2008 |
| JP | 2008196013 | * | 8/2008 |
| WO | 2007/043315 | | 4/2007 |
| WO | 2007/043316 | | 4/2007 |

OTHER PUBLICATIONS

International Search Report issued Oct. 6, 2009 in International (PCT) Application No. PCT/JP2009/064604.

* cited by examiner

POWER TRANSMISSION SHAFT, DRIVE SHAFT, AND PROPELLER SHAFT

TECHNICAL FIELD

The present invention relates to a power transmission shaft, a drive shaft, and a propeller shaft used for power transmission in automobiles and various industrial machines.

BACKGROUND ART

Power transmission shaft used for many machine components of automobiles, various industrial machines, and the like performs torque transmission normally by engaging serrations, splines, and the like formed on an outer periphery thereof with a mating member (boss). In consideration of plastic workability, machine workability, and cost, a torque-transmission teeth portion such as serrations or splines is used with higher axial strength obtained by subjecting medium carbon steel or low-alloy steel to surface-hardening treatment such as induction hardening, carburizing and quenching, or nitriding, or to heat treatment such as thermal refining.

Figure 5A:
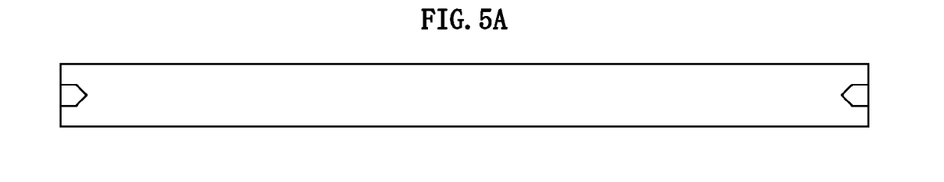
FIG. 5A A view illustrating a cutting-out step of the power transmission shaft.
Figure 5B:
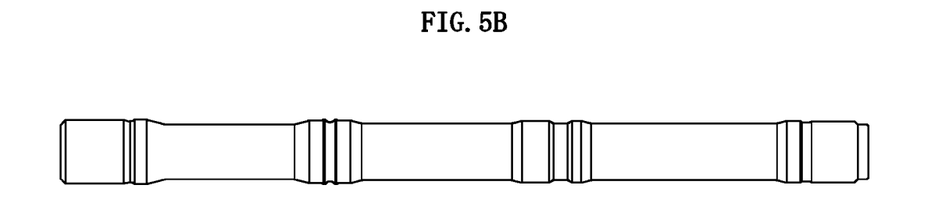
FIG. 5B A view illustrating an outer diameter lathing step of the power transmission shaft.
Figure 5C:
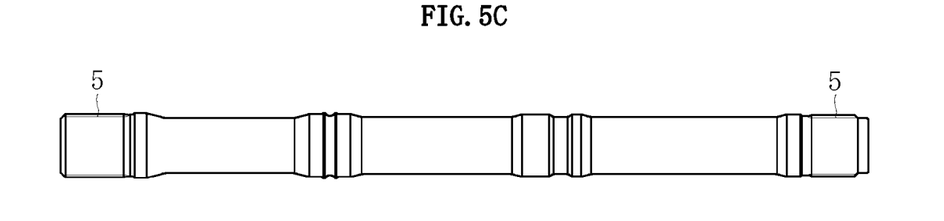
FIG. 5C A view illustrating a rolling step of serrations at both end portions of the power transmission shaft.
Figure 5D:
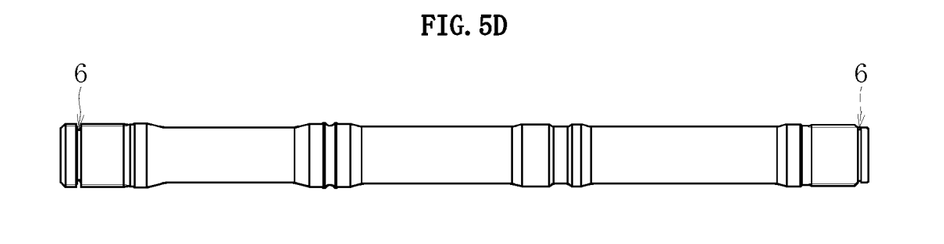
FIG. 5D A view illustrating a lathing step of a clip groove at both the end portions of the power transmission shaft.
Figure 5E:
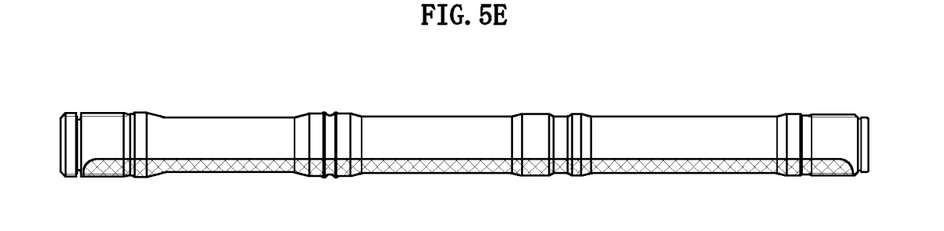
FIG. 5E A view illustrating an induction hardening step and an induction tempering step of the power transmission shaft.
Figure 5F:
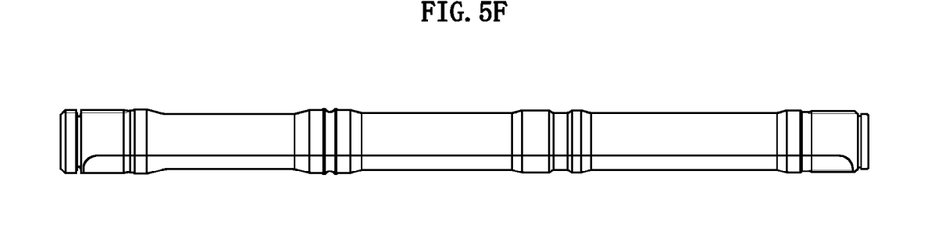
FIG. 5F A view illustrating an outer diameter bake-coating step of the power transmission shaft.

For example, general manufacturing steps of a power transmission shaft used as a drive shaft for automobiles includes, in the following order, a cutting-out step illustrated in FIG. 5A of a bar-like base material, an outer diameter lathing step illustrated in FIG. 5B of the base material, a rolling step illustrated in FIG. 5C of serrations 5 at both end portions, a lathing step illustrated in FIG. 5D of clip grooves 6 at both the end portions, an induction hardening step and a induction tempering step illustrated in FIG. 5E, and an outer diameter bake-coating step illustrated in FIG. 5F.

As an example of a method of enhancing axial strength through heat treatment, there may be provided an invention described in Patent Literature 1. In the invention, a shaft-like machine component undergoes induction hardening or carburizing and quenching, and a ratio of an effective hardened-layer depth to a component radius is set to range from 0.4 to 0.8.

Further, each of Patent Literatures 2, 3, and 4 discloses an invention of setting the ratio of the effective hardened-layer depth to the component radius (hereinafter, referred to as hardened-layer ratio). The hardened-layer ratios of the inventions described in Patent Literatures 2, 3, and 4 are set to 0.4 or more, 0.45 or more, and 0.5 or more, respectively.

In the inventions described in the publications just described above, the torque-transmission teeth portion such as splines and the smooth-surface like smooth portion free from teeth of this type undergo heat treatment without particular distinction. In those inventions, the torque-transmission teeth portion and the smooth portion undergo heat treatment probably at the same time and under the same condition, and hardening depths in this case are substantially uniform over the torque-transmission teeth portion and the smooth portion (refer to hatched portion of FIG. 5E)

For enhancement of strength of the power transmission shaft, enhancement is required from both of the following aspects: static torsional strength (static strength) and torsional fatigue strength (dynamic strength). The static torsional strength is determined mainly based on a size of an axial diameter, and the fatigue strength is determined based on the axial diameter and a stress-concentration factor. Further, in comparison with static torsional strength of the torque-transmission teeth portion such as splines and that of the smooth portion, the static torsional strength of the smooth portion is lower than that of the torque-transmission teeth portion. Meanwhile, torsional fatigue strength of the smooth portion is apt to be higher than that of the torque-transmission teeth portion.

With a focus on difference in characteristics between the torque-transmission teeth portion and the smooth portion, in the inventions described in Patent Literatures 5 and 6, the torque-transmission teeth portion and the smooth portion are different from each other in hardening depth. That is, in the invention of Patent Literature 5 or 6, an effective hardened-layer depth (or hardened-layer ratio) of the smooth portion is set to be larger than an effective hardened-layer depth (or hardened-layer ratio) of the torque-transmission teeth portion.

CITATION LIST

Patent Literature

Patent Literature 1: JP 3194093 B
Patent Literature 2: JP 2007-107029 A
Patent Literature 3: JP 3539981 B
Patent Literature 4: JP 2007-107027 A
Patent Literature 5: JP 2000-240669 A
Patent Literature 6: JP 2006-138007 A

SUMMARY OF INVENTION

Technical Problem

In recent years, as global environment problems draw more attention, for example, in the field of automobiles, there have been strong demands for more strict gas emission regulations and higher energy efficiency. As a measure therefor, there have been strong demands for further weight reduction and enhancement of strength of a power transmission shaft such as a propeller shaft and a drive shaft. Further, in order that a constant velocity universal joint used for a propeller shaft, a drive shaft, and the like is able to form an operating angle as high as possible, there have been strong demands for reduction in diameter and enhancement of strength of power transmission members. Those demands may not be sufficiently satisfied by the inventions described in Patent Literatures described above.

Under the circumstances, the present invention has been made to achieve an object of enhancement of strength of a power transmission shaft, in particular, of the static torsional strength of the smooth portion.

Solution to Problem

In a first aspect of the invention, power transmission shaft includes: a torque-transmission teeth portion formed on an outer peripheral surface on an end portion side; and a smooth portion formed on the outer peripheral surface adjacent to the torque-transmission teeth portion so as to have a stepwise reduced diameter, in which: a ratio of a minimum diameter of the smooth portion to a minimum diameter of the torque-transmission teeth portion is set to 0.9 or more and 1.02 or less; the torque-transmission teeth portion and the smooth portion undergo heat treatment so as to from a heat-treated hardened layer; the heat-treated hardened layer is formed to increase in depth from a side of the torque transmission teeth portion to a side of the smooth portion; and at least a minimum diameter portion of the smooth portion undergoes full hardening for forming the heat-treated hardened layer from a surface to an axis.

In the power transmission shaft of the present invention, the hardened layer is formed to increase in depth from the side of the torque transmission teeth portion to the side of the smooth portion, and at least the minimum diameter portion of the smooth portion is full-hardened. Thus, static torsional strength of the smooth portion can be enhanced. Accordingly, the smooth portion, in particular, the minimum diameter portion thereof can be further reduced in diameter while the strength of the smooth portion is sufficiently maintained.

Further, in the present invention, the ratio of the minimum diameter of the smooth portion to the minimum diameter of the torque-transmission teeth portion is set to 0.9 or more and 1.02 or less. This is because, when the ratio of the minimum diameter of the smooth portion to the minimum diameter of the torque-transmission teeth portion is less than 0.9, sufficient static torsional strength cannot be obtained. Meanwhile, when the ratio of the minimum diameter of the smooth portion to the minimum diameter of the torque-transmission teeth portion exceeds 1.02, further reduction in diameter of the minimum diameter of the smooth portion is less liable to be achieved.

In a second aspect of the invention, the power transmission shaft according to the first aspect includes: a ratio of a layer thickness of the heat-treated hardened layer of the torque-transmission teeth portion to an axial radius thereof is set to 0.4 or more and 0.65 or less; and a surface hardness of the torque-transmission teeth portion is set to Hv 650 or more and Hv 690 or less.

When the ratio of the layer thickness to the axial radius is less than 0.4, sufficient static torsional strength cannot be obtained. Meanwhile, when the ratio of the layer thickness to the axial radius exceeds 0.65, there is a risk that surface compressive-residual stress of the torque-transmission teeth portion is reduced, which leads to reduction of fatigue strength. Further, when the surface hardness of the torque-transmission teeth portion is less than Hv 650, there is a concern about occurrence of abrasion due to cyclic loading. Meanwhile, when the surface hardness of the torque-transmission teeth portion exceeds Hv 690, there is a risk of reduction of fatigue strength due to embrittlement.

A third aspect of the invention includes the a power transmission shaft according to the first or second aspect, in which: the surface hardness of the torque-transmission teeth portion is set to be lower than a surface hardness of the minimum diameter portion of the smooth portion; and an upper limit value of a difference of the surface-hardness of the minimum diameter portion of the smooth portion and the surface-hardness of the torque-transmission teeth portion is set to Hv 60.

The torque-transmission teeth portion has notch brittleness, and hence is required to have a hardness lower than that of the smooth portion. Further, when the difference of the surface-hardness of the minimum diameter portion of the smooth portion and the surface-hardness of the torque-transmission teeth portion exceeds Hv 60, a service life in a high-cycle region is markedly reduced, and hence the upper limit value thereof is set to Hv 60.

A fourth aspect of the invention includes the power transmission shaft according to anyone of the first to third aspects, in which a hardness of an axial center portion of a fully-hardened part of the smooth portion is set to Hv 400 or more and Hv 600 or less.

When the hardness of the axial center portion of the fully-hardened part of the smooth portion is less than Hv 400, reduction of static torsional strength is involved. Meanwhile, when the hardness of the axial center portion of the fully-hardened part of the smooth portion exceeds Hv 600, there is a risk that a surface compressive-residual stress is less liable to be obtained, which leads to reduction of fatigue strength (high-cycle condition).

A fifth aspect of the invention includes the power transmission shaft according to any one of the first to fourth aspects, in which a surface compressive-residual stress of the fully-hardened part of the smooth portion is set to 400 MPa or more and 800 MPa or less.

When the surface compressive-residual stress of the fully-hardened part of the smooth portion is less than 400 MPa, sufficient fatigue strength cannot be obtained. Meanwhile, when an attempt is made so that the surface compressive-residual stress of the fully-hardened part exceeds 800 MPa an increase in manufacturing cost may occur, which being not preferred.

A sixth aspect of the invention includes the power transmission shaft according to anyone of the first to fifth aspects, in which an average prior austenite grain size of the heat-treated hardened layer is set to 8 μm or more and 35 μm or less.

When the average prior austenite grain size of the heat-treated hardened layer exceeds 35 μm, sufficient grain-boundary strength cannot be obtained. Meanwhile, in order to set the average prior austenite grain size to less than 8 μm, reduction of a quenching temperature is required. Thus, quenching is liable to be incomplete, which leads to a risk that predetermined strength cannot be obtained.

A seventh aspect of the invention includes the power transmission shaft according to any one of the first to sixth aspects, in which a carbon content of a raw material of the power transmission shaft is set to 0.37 wt % or more and 0.44 wt % or less.

By setting of the content of carbon (C) within the range just described above, sufficient hardness and depth of the hardened layer after induction hardening can be obtained and the strength thereof can be enhanced. This is because, when the content of C is less than 0.37 wt %, it is difficult to secure required strength and to generate the bainite structure. Meanwhile, when the content of C exceeds 0.44 wt %, grain-boundary strength is reduced, and machinability, cold forgeability, and quenching-crack resistance are deteriorated.

An eighth aspect of the invention includes the power transmission shaft according to any one of the first to seventh aspects, in which the power transmission shaft contains as materials: 0.02 wt % or more and 0.25 wt % or less of silicon; 0.6 wt % or more and 1.2 wt % or less of manganese; 0.02 wt % or less of phosphorus; 0.025 wt % or less of sulfur; 0.0005 wt % or more and 0.0035 wt % or less of boron; and 0.01 wt % or more and 0.05 wt % or less of titanium.

By setting of contents of elements as described above, excellent strength, durability, manufacturability, and the like can be obtained.

In a ninth aspect the invention, the power transmission shaft according to any one of the first to eighth aspects is coupled to a constant velocity universal joint, in which the minimum diameter portion of the smooth portion is formed at a part which approaches the constant velocity universal joint when the constant velocity universal joint forms a maximum operating angle.

When the minimum diameter portion formed at the above-mentioned part is further reduced in diameter, the constant velocity universal joint and the power transmission shaft are less liable to interfere with each other when the constant velocity universal joint forms an operating angle. Thus, the constant velocity universal joint is able to form higher operating angles.

In a tenth aspect of the invention, the power transmission shaft according to any one of the first to ninth aspects is applied to a stab shaft.

With this, the stab shaft can be reduced in diameter while the strength thereof is sufficiently maintained.

In an eleventh aspect of the invention, a drive shaft includes an intermediate shaft having both end portions to which constant velocity universal joints are mounted, in which the power transmission shaft according to any one of the first to ninth aspects is applied to the intermediate shaft.

With this, the intermediate shaft of the drive shaft can be reduced in diameter while the strength thereof is sufficiently maintained.

In a twelfth aspect of the invention, a propeller shaft includes an intermediate shaft having both end portions to which constant velocity universal joints are mounted through intermediation of stab shafts, in which the power transmission shaft according to any one of the first to ninth aspects is applied to each of the stab shafts.

With this, the stab shafts of the propeller shaft can be reduced in diameter while the strength thereof is sufficiently maintained.

Advantageous Effects of Invention

According to the present invention, static torsional strength of the smooth portion can be enhanced, and hence the smooth portion can be further reduced in diameter while maintaining sufficient strength. With this, a power transmission shaft can be provided, which is highly reliable and is able to achieve weight reduction and formation of higher operating angles of the constant velocity universal joint.

REFERENCE SIGNS LIST 1 power transmission shaft
2 torque-transmission teeth portion
3 smooth portion
3a minimum diameter portion
4 hardened layer
10 drive shaft
11 intermediate shaft
12 plunging type constant velocity universal joint
13 fixed type constant velocity universal joint
20 propeller shaft
21 intermediate shaft
22 plunging type constant velocity universal joint
23 fixed type constant velocity universal joint
24 stab shaft
25 stab shaft
31 power transmission shaft
32 torque-transmission teeth portion
33 smooth portion
33a minimum diameter portion
40 fixed type constant velocity universal joint
D2 min minimum diameter
D3 min minimum diameter
X axis

DETAILED DESCRIPTION OF THE INVENTION

Description is made of a structure of a power transmission shaft according to the present invention.

Figure 1:
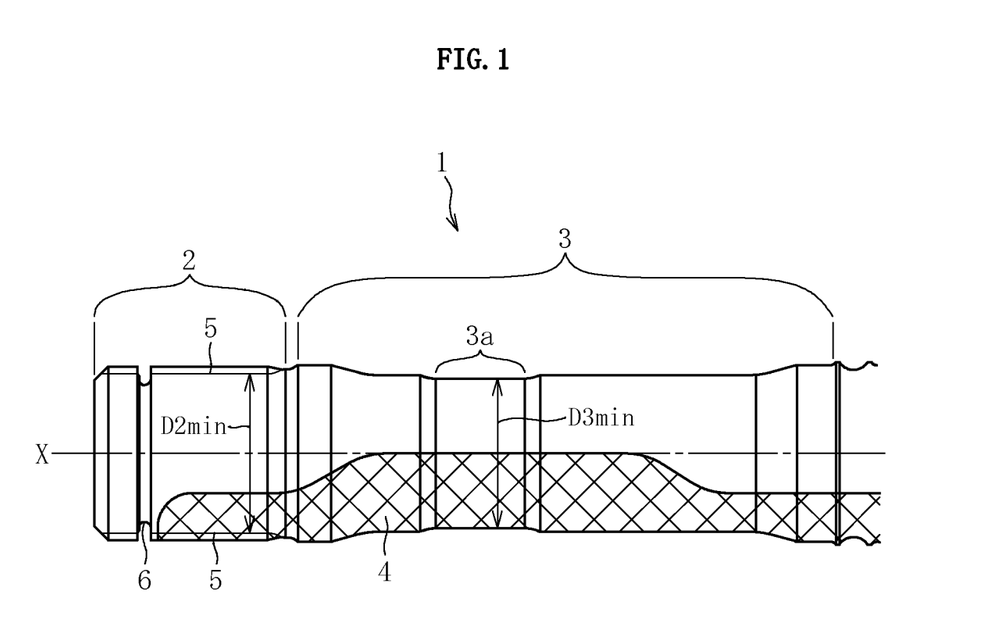
FIG. 1 A view illustrating one end portion of a power transmission shaft of the present invention.

FIG. 1 illustrates one end portion of the power transmission shaft according to the present invention. A power transmission shaft 1 illustrated in FIG. 1 is constituted by a solid shaft. On an outer peripheral surface of the end portion of the power transmission shaft 1, there is formed a torque-transmission teeth portion 2 for engaging the power transmission shaft 1 with a mating member for the purpose of performing torque transmission. The torque-transmission teeth portion 2 is provided with a plurality of recess portions 5 such as serrations or splines formed in an axial direction. Further, the torque-transmission teeth portion 2 is provided with a clip groove 6 formed in a peripheral direction for the purpose of fitting a retention clip thereinto.

On a part of the outer peripheral surface of the power transmission shaft 1, there is formed a smooth-surface like smooth portion 3 free from teeth such as serrations, the part being adjacent to the torque-transmission teeth portion 2. The smooth portion 3 is formed to have a stepwise reduced diameter. In FIG. 1, the smooth portion 3 is reduced stepwise in diameter from both end portions thereof to a central portion.

The outer peripheral surface of the power transmission shaft 1 undergoes heat treatment by induction hardening. In FIG. 1, a hatched portion on a lower side with respect to an axis X indicates a heat-treated hardened layer 4 (hereinafter, simply referred to as hardened layer 4) formed by the heat treatment. Note that, although the hardened layer 4 formed by the heat treatment is formed similarly over the peripheral direction of the power transmission shaft 1, the hatched portion of FIG. 1 indicates cross-section (depth) of the hardened layer 4.

The hardened layer 4 is formed to increase in depth from a side of the torque transmission teeth portion 2 to a side of the smooth portion 3. At least a minimum diameter portion 3a of the smooth portion 3 undergoes full hardening for forming the hardened layer 4 from a surface to the axis X. Further, with focus on the depth of the hardened layer 4 in the smooth portion 3, the hardened layer 4 increases in depth from maximum diameter portions on both end sides of the smooth portion 3 to the minimum diameter portion 3a of the central portion, and the depth of the hardened layer 4 reaches the axis X at the minimum diameter portion 3a and a vicinity thereof.

Further, a hardness of an axial center portion of a fully-hardened part of the smooth portion 3 is set to Hv 400 or more and Hv 600 or less. When the hardness of the axial center portion of the fully-hardened part is less than Hv 400, reduction of static torsional strength is involved. Meanwhile, when the hardness of the axial center portion of the fully-hardened part exceeds Hv 600, there is a risk that surface compressive-residual stress is less liable to be obtained, which leads to reduction of fatigue strength (high-cycle condition).

In addition, surface compressive-residual stress of the fully-hardened part of the smooth portion 3 is set to 400 MPa or more and 800 MPa or less. When the surface compressive-residual stress of the fully-hardened part is less than 400 MPa, sufficient fatigue strength cannot be obtained. Meanwhile, when an attempt is made so that the surface compressive-residual stress of the fully-hardened part exceeds 800 MPa, an increase in manufacturing cost may occur, which being not preferred.

In FIG. 1, a minimum diameter of the torque-transmission teeth portion 2 is represented by reference symbol D2 min, and a minimum diameter of the smooth portion 3 is represented by reference symbol D3 min. In the present invention, a ratio of the minimum diameter D3 min of the smooth portion 3 to the minimum diameter D2 min of the torque-transmission teeth portion 2 (D3 min/D2 min) is set to 0.9 or more and 1.02 or less. When D3 min/D2 min is less than 0.9, sufficient static torsional strength cannot be obtained. Meanwhile, when D3 min/D2 min exceeds 1.02, the minimum diameter D3 min of the smooth portion 3 is large. Thus, objects such as weight reduction of the power transmission shaft 1 and higher operating angles of the constant velocity universal joint are less liable to be achieved, which is not preferred.

Further, by the definition that a ratio of a layer thickness t of the hardened layer 4 to an axial radius r of the power transmission shaft 1 (t/r) is a hardened-layer ratio, the hardened-layer ratio in the torque-transmission teeth portion 2 is set to 0.4 or more and 0.65 or less. When the hardened-layer ratio is less than 0.4, sufficient static torsional strength cannot be obtained. Meanwhile, when the hardened-layer ratio exceeds 0.65, there is a risk that the surface compressive-residual stress of the torque-transmission teeth portion 2 is reduced, which leads to reduction of fatigue strength.

In addition, a surface hardness of the torque-transmission teeth portion 2, which is achieved by heat treatment, is set to Hv 650 or more and Hv 690 or less. When the surface hardness of the torque-transmission teeth portion 2 is less than Hv 650, there is a concern about occurrence of abrasion due to cyclic loading. Meanwhile, when the surface hardness of the torque-transmission teeth portion 2 exceeds Hv 690, there is a risk of reduction of fatigue strength due to embrittlement.

The torque-transmission teeth portion 2 has notch brittleness, and hence is required to have a hardness lower than that of the smooth portion 3. Thus, the surface hardness of the torque-transmission teeth portion 2, which is achieved by heat treatment, is set to be lower than a surface hardness of the minimum diameter portion 3a of the smooth portion 3, which is achieved by heat treatment. In order to lower the hardness, by setting of a maximum heating temperature of the torque-transmission teeth portion 2 at the time of quenching to be lower than that of the smooth portion 3, a quenching degree is alleviated. Note that, when a difference of the surface-hardness of the minimum diameter portion 3a of the smooth portion 3 and the surface-hardness of the torque-transmission teeth portion 2 exceeds Hv 60, a service life in a high-cycle region is markedly reduced, and hence an upper limit value thereof is set to Hv 60.

Further, an average prior austenite grain size of the hardened layer 4 is set to 8 μm or more and 35 μm or less. When the average prior austenite grain size exceeds 35 μm, sufficient grain-boundary strength cannot be obtained. Meanwhile, in order to set the average prior austenite grain size to less than 8 μm, reduction of a quenching temperature is required. Thus, quenching is liable to be incomplete, which leads to a risk that predetermined strength cannot be obtained.

Hereinabove, description has been made of the structure of the one end portion of the power transmission shaft 1 with reference to FIG. 1. Another end portion on an opposite side may be similarly structured.

In the following, description is made of a material of the power transmission shaft of the present invention.

Of steel-material components constituting the power transmission shaft of the present invention, carbon (C) is an element which has a most significant influence on hardenability of the power transmission shaft. Further, when a structure of a base material of the power transmission shaft, that is, a structure prior to quenching contains a bainite structure at a particular fraction, generated austenite is refined. This is because carbides are dispersed in the bainite structure more finely than in a ferrite-pearlite structure, and hence an area of a ferrite/carbide interface as a nucleation site of austenite increases at the time of quench heating. As a result, a grain size of a quench-hardened layer is reduced, which leads to enhancement of grain-boundary strength, torsional fatigue strength, and quenching-crack resistance.

In the present invention, a content of C is set to 0.37 wt % or more and 0.44 wt % or less. Setting of the content of C within the range just described above achieves sufficient hardness and depth of the hardened layer after induction hardening, to thereby enable enhancement of the strength thereof. This is because, when the content of C is less than 0.37 wt %, it is difficult to secure required strength and to generate the bainite structure. Meanwhile, when the content of C exceeds 0.44 wt %, grain-boundary strength is reduced, and machinability, cold forgeability, and quenching-crack resistance are deteriorated.

Further, a content of silicon (Si) is set to 0.02 wt % or more and 0.25 wt % or less, a content of manganese (Mn) is set to 0.6 wt % or more and 1.2 wt % or less, a content of phosphorus (P) is set to 0.02 wt % or less, a content of sulfur (S) is set to 0.025 wt % or less, a content of boron (B) is set to 0.0005 wt % or more and 0.0035 wt % or less, and a content of titanium (Ti) is set to 0.01 wt % or more and 0.05 wt % or less. In the following, description is made of a reason why the contents of the elements are set as just described above.

Si has action of suppressing softening due to tempering. However, an excessive content of Si leads to deterioration in workability such as machinability and forging property, and deterioration in quenching-crack resistance. Thus, the above-mentioned setting is made.

Mn is an element for enhancing hardenability, and is essential to secure the depth of the hardened layer 4 after induction hardening. However, when the content of Mn is less than 0.6 wt %, effects of addition of Mn is less liable to be obtained. Meanwhile, when the content of Mn exceeds 1.2 wt %, a hardness of the material increases. As a result, workability such as form-rollability and machinability is deteriorated, and quenching-crack resistance is also deteriorated.

P is an unavoidable impurity contained in a steel-material component. P contained therein segregates at a prior austenite grain boundary to have adverse effects of reduction of grain-boundary strength and promotion of quenching cracks. Thus, the content of P is preferred to be as small as possible, and hence is set to 0.02 wt % or less.

S is a useful element which is combined with Mn contained in the steel material to form manganese sulfide (MnS), thereby enhancing machinability. However, when the content of S exceeds 0.025 wt %, an amount of MnS increases, which leads to a risk of reduction of strength.

B has action of enhancing hardenability by being added by a minute amount and increasing a hardening depth so as to enhance strength. Further, B plays a role for enhancing grain-boundary strength by segregating at a grain boundary so as to reduce concentration of P segregating at the grain boundary. In addition, enhancement of grain-boundary strength leads to enhancement of quenching-crack resistance. Note that, when the content of B is less than 0.0005 wt %, the action obtained by addition of B is less liable to be obtained. Meanwhile, when the content of B exceeds 0.0035 wt %, the effect reaches the limit, which disadvantageously leads to an increase in cost.

Ti is added to obtain an effect of enhancement of hardenability achieved by the above-mentioned B. In other words, when nitrogen (N) is contained in the steel-material component, B and N are combined with each other to form boron nitride (BN), and hence the effect of enhancement of hardenability obtained by adding B is blocked. However, when Ti is contained, titanium nitride (TiN) is formed in priority to BN, and hence the effect of B is efficiently exerted. For this purpose, Ti is required to be contained by at least 0.01 wt %. Meanwhile, when the content of Ti exceeds 0.05 wt %, a large amount of TiN is formed, which leads to a risk of reduction of strength.

The above-mentioned manufacturing steps (manufacturing method) of the power transmission shaft of the present invention is basically the same as the manufacturing steps described with reference to FIG. 5. Note that, in the induction hardening step according to the power transmission shaft of the present invention, it is preferred to perform induction hardening by moving a movable heating coil (movable heat source) from the torque-transmission teeth portion 2 of the axial end portion to the smooth portion 3 in this order. Induction hardening performed in such a manner facilitates control on preheat of the movable heating coil, formation of the hardened layer 4 to increase in depth from the side of the torque transmission teeth portion 2 to the side of the smooth portion 3, and full hardening of at least the minimum diameter portion 3a of the smooth portion 3. Further, for ease of formation of the above-mentioned hardened layer 4 of the present invention, it is preferred to perform the induction hardening at a frequency of 3 kHz or less. Note that, under some setting conditions, a tempering effect may be obtained in the bake-coating step. Thus, in that case, a tempering step may be omitted.

Figure 2:
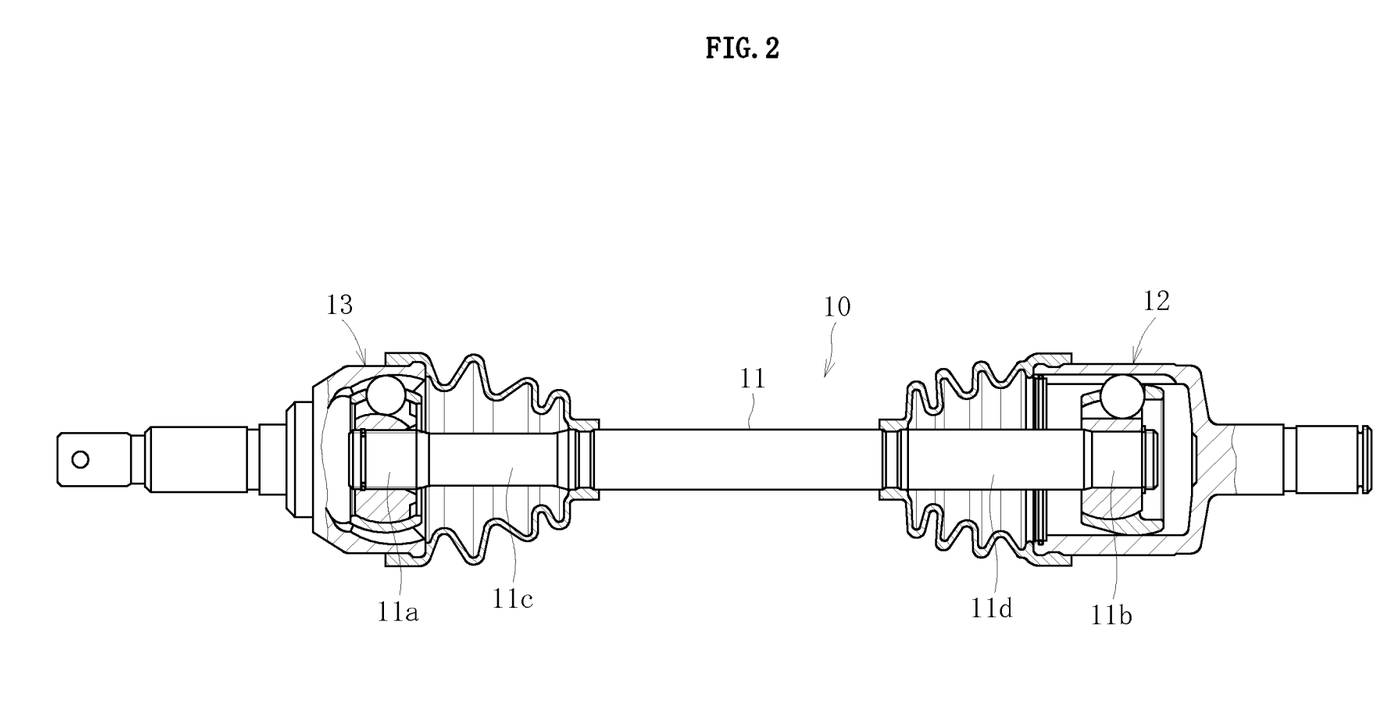
FIG. 2 An overall structural view of a drive shaft.

FIG. 2 illustrates a general drive shaft 10 (on front side) used for automobiles and the like. The drive shaft 10 is constituted by constant velocity universal joints 12 and 13 mounted to both ends of an intermediate shaft 11. The constant velocity universal joint 12 on a right side of FIG. 2 is a plunging type constant velocity universal joint, and the constant velocity universal joint 13 on a left side thereof is a fixed type constant velocity universal joint. At both the end portions of the intermediate shaft 11, there are formed torque-transmission teeth portions 11a and 11b constituted by serrations or splines, and both the constant velocity universal joints 12 and 13 are coupled to the torque-transmission teeth portions 11b and 11a, respectively. Further, the intermediate shaft 11 is provided with smooth portions 11c and 11d respectively adjacent to the torque-transmission teeth portions 11a and 11b. The structure of the present invention is applicable to the coupling end portions between the intermediate shaft 11 of the drive shaft 10 as just described above and the constant velocity universal joints 12 and 13.

Figure 3:
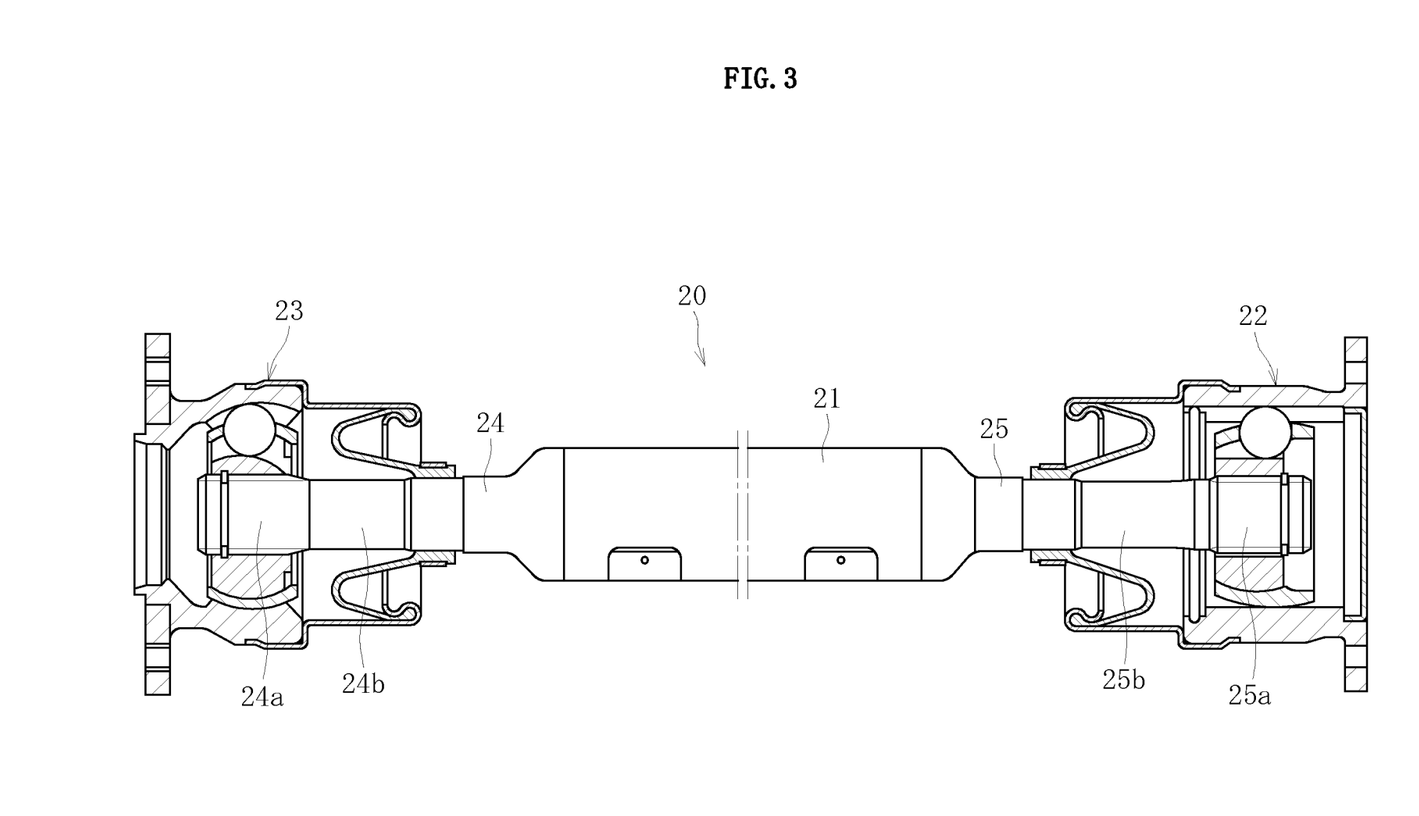
FIG. 3 An overall structural view of a propeller shaft.

Further, FIG. 3 illustrates a general propeller shaft 20 used for automobiles and the like. The propeller shaft 20 is constituted by constant velocity universal joints 22 and 23 mounted respectively to both ends of a hollow intermediate shaft 21 through intermediation of solid stab shafts 24 and 25. The constant velocity universal joint 22 on a right side of FIG. 3 is a plunging type constant universal velocity joint, and the constant velocity universal joint 23 on a left side thereof is a fixed type constant velocity universal joint. At end portions of the stab shafts 24 and 25, there are respectively formed torque-transmission teeth portions 24a and 25a constituted by serrations or splines, and both the constant velocity universal joints 22 and 23 are coupled to the torque-transmission teeth portions 25a and 24a, respectively. The stab shafts 24 and 25 are provided with smooth portions 24b and 25b, respectively, adjacent to the respective torque-transmission teeth portions 24a and 25a. The structure of the present invention is applicable also to the coupling end portions between the stab shafts 24 and 25 and the constant velocity universal joints 23 and 22, respectively.

Figure 4:
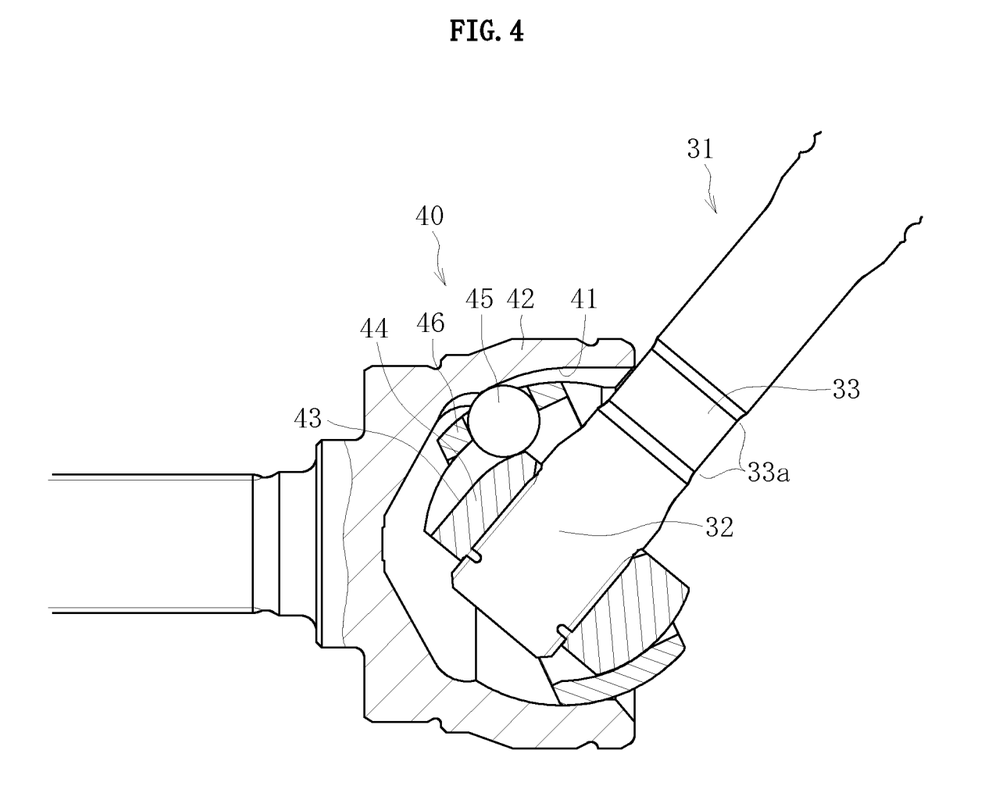
FIG. 4 A view illustrating a state in which the power transmission shaft is coupled to a fixed type constant velocity universal joint and the fixed type constant velocity universal joint forms a maximum operating angle.

FIG. 4 illustrates a state in which a power transmission shaft 31 of the present invention applied to a drive shaft or a propeller shaft is coupled to a fixed type constant velocity universal joint 40 and the fixed type constant velocity universal joint 40 forms a maximum operating angle.

The fixed type constant velocity universal joint 40 includes an outer joint member 42 having an inner peripheral surface provided with a plurality of guide grooves 41, an inner joint member 44 having an outer peripheral surface provided with a plurality of guide grooves 43, a plurality of balls 45 interposed between the guide grooves 41 of the outer joint member 42 and the guide grooves 43 of the inner joint member 44 so as to transmit torque, and a cage 46 interposed between the outer joint member 42 and the inner joint member 44 so as to retain the balls 45. The fixed type constant velocity universal joint illustrated in FIG. 4 is a constant velocity universal joint of an undercut free type (UJ) in which both the guide grooves 41 of the outer joint member 42 and the guide grooves 43 of the inner joint member 44 have straight bottoms. Note that, the above-mentioned fixed type constant velocity universal joint is not limited to the undercut free type (UJ), and a Birfield type (BJ) may be employed, in which the entire regions of the guide grooves are formed in a curved manner.

Meanwhile, the power transmission shaft 31 includes a torque-transmission teeth portion 32 formed at an end portion thereof and a smooth portion 33 formed adjacent to the torque-transmission teeth portion 32. The torque-transmission teeth portion 32 is coupled through intermediation of serrations or splines formed in an inner peripheral surface of the inner joint member 44. The smooth portion 33 is formed to have a stepwise reduced diameter, and a minimum diameter portion 33a of the smooth portion 33 is formed at a part of the power transmission shaft 31, the part approaching the fixed type constant velocity universal joint when the fixed type constant velocity universal joint 40 forms a maximum operating angle.

According to the structure of the present invention, as illustrated in FIG. 1, the hardened layer 4 is formed to increase in depth from the side of the torque transmission teeth portion 2 to the side of the smooth portion 3, and at least the minimum diameter portion 3a of the smooth portion 3 is full-hardened. Thus, static torsional strength of the smooth portion 3 can be enhanced. Accordingly, the smooth portion 3 can be further reduced in diameter while the strength of the smooth portion 3 is sufficiently maintained, and hence weight reduction of the power transmission shaft 1 can be achieved.

Further, as illustrated in FIG. 4, when the power transmission shaft 31 of the present invention is coupled to the fixed type constant velocity universal joint 40, reduction in diameter particularly of the minimum diameter portion 33a of the smooth portion 33 enables formation of higher operating angles of the fixed type constant velocity universal joint 40. Alternatively, the part of the fixed type constant velocity universal joint 40, which the minimum diameter portion 33a approaches at a high operating angle, can be thicker correspondingly to reduction in diameter of the minimum diameter portion 33a of the smooth portion 33. Thus, strength of the fixed type constant velocity universal joint 40 also can be enhanced. In particular, when the constant velocity universal joint is of the undercut free type (UJ), contact points of the balls in the guide grooves of the outer joint member at a high operating angle are designed to be close to a relief for avoiding interference with the shaft (power transmission shaft). Thus, a larger thickness of a part, at which the relief is formed, can be largely expected to lead to an effect of enhancement of strength thereof. Further, formation of the minimum diameter portion 33a of the smooth portion 33 only at the part approaching the fixed type constant velocity universal joint enables minimization of deterioration in torsional rigidity of the power transmission shaft 31.

Hereinabove, description is made of the power transmission shaft of the present invention. As a matter of course, the present invention is not limited to the above-mentioned description in this embodiment, and various modifications can be made thereto without departing from the spirit of the present invention. The structure of the present invention may be applicable not only to drive shafts or propeller shafts for automobiles but also to power transmission shafts used for various other industrial machines.

The invention claimed is:

1. A power transmission shaft, comprising:
   a torque-transmission teeth portion formed on an outer peripheral surface on an end portion side; and
   a smooth portion formed on the outer peripheral surface adjacent to the torque-transmission teeth portion so as to have a stepwise reduced diameter, wherein:
   a ratio of a minimum diameter of the smooth portion to a minimum diameter of the torque-transmission teeth portion is set to 0.9 or more and 1.02 or less;
   a carbon content of a raw material of the power transmission shaft is set to 0.37 wt % or more and 0.44 wt % or less;
   the torque-transmission teeth portion and the smooth portion undergo heat treatment so as to form a heat-treated hardened layer;
   the heat-treated hardened layer increases in depth from a side of the torque transmission teeth portion to a side of the smooth portion;
   at least a minimum diameter portion of the smooth portion undergoes full hardening for forming the heat-treated hardened layer from a surface to a central axis; and
   an average prior austenite grain size of the heat-treated hardened layer is set to 8 μm or more and 35 μm or less.

2. A power transmission shaft according to claim 1, wherein:
   a ratio of a layer thickness of the heat-treated hardened layer of the torque-transmission teeth portion to an axial radius thereof is set to 0.4 or more and 0.65 or less; and
   a surface hardness of the torque-transmission teeth portion is set to Hv 650 or more and Hv 690 or less.

3. A power transmission shaft according to claim 2, wherein:
   the surface hardness of the torque-transmission teeth portion is set to be lower than a surface hardness of the minimum diameter portion of the smooth portion; and
   an upper limit value of a difference of the surface-hardness of the minimum diameter portion of the smooth portion and the surface hardness of the torque-transmission teeth portion is set to Hv 60.

4. A power transmission shaft according to claim 3, wherein a hardness of an axial center portion of a fully-hardened part of the smooth portion is set to Hv 400 or more and Hv 600 or less.

5. A power transmission shaft according to claim 3, wherein a surface compressive-residual stress of a fully-hardened part of the smooth portion is set to 400 MPa or more and 800 MPa or less.

6. A power transmission shaft according to claim 2, wherein a hardness of an axial center portion of a fully-hardened part of the smooth portion is set to Hv 400 or more and Hv 600 or less.

7. A power transmission shaft according to claim 2, wherein a surface compressive-residual stress of a fully-hardened part of the smooth portion is set to 400 MPa or more and 800 MPa or less.

8. A power transmission shaft according to claim 1, wherein:
   a surface hardness of the torque-transmission teeth portion is set to be lower than a surface hardness of the minimum diameter portion of the smooth portion; and
   an upper limit value of a difference of the surface-hardness of the minimum diameter portion of the smooth portion and the surface hardness of the torque-transmission teeth portion is set to Hv 60.

9. A power transmission shaft according to claim 8, wherein a hardness of an axial center portion of a fully-hardened part of the smooth portion is set to Hv 400 or more and Hv 600 or less.

10. A power transmission shaft according to claim 8, wherein a surface compressive-residual stress of a fully-hardened part of the smooth portion is set to 400 MPa or more and 800 MPa or less.

11. A power transmission shaft according to claim 1, wherein a hardness of an axial center portion of a fully-hardened part of the smooth portion is set to Hv 400 or more and Hv 600 or less.

12. A power transmission shaft according to claim 11, wherein a surface compressive-residual stress of the fully-hardened part of the smooth portion is set to 400 MPa or more and 800 MPa or less.

13. A power transmission shaft according to claim 1, wherein a surface compressive-residual stress of a fully-hardened part of the smooth portion is set to 400 MPa or more and 800 MPa or less.

14. A power transmission shaft according to claim 1, wherein the power transmission shaft contains as materials: 0.02 wt % or more and 0.25 wt % or less of silicon; 0.6 wt % or more and 1.2 wt % or less of manganese; 0.02 wt % or less of phosphorus; 0.025 wt % or less of sulfur; 0.0005 wt % or more and 0.0035 wt % or less of boron; and 0.01 wt % or more and 0.05 wt % or less of titanium.

15. A power transmission shaft according to claim 1, which is coupled to a constant velocity universal joint, wherein the minimum diameter portion of the smooth portion is formed at a part which approaches the constant velocity universal joint when the constant velocity universal joint forms a maximum operating angle.

16. A power transmission shaft according to claim 1, which is applied to a stab shaft.

17. A drive shaft, comprising an intermediate shaft having both end portions to which constant velocity universal joints are mounted,
   wherein the power transmission shaft according to claim 1 is applied to the intermediate shaft.

18. A propeller shaft, comprising an intermediate shaft having both end portions to which constant velocity universal joints are mounted through intermediation of stab shafts,
wherein the power transmission shaft according to claim 1 is applied to each of the stab shafts.

* * * * *